United States Patent [19]
Smay et al.

[11] 3,926,604
[45] Dec. 16, 1975

[54] METHOD FOR APPLYING AN INORGANIC TITANIUM COATING TO A GLASS SURFACE

[75] Inventors: Gary Lynn Smay, Butler; Ronald Van Caporali, West Sunbury; Russell Duty Southwick, Butler, all of Pa.

[73] Assignee: Glass Container Manufacturers Institute, Inc., Washington, D.C.

[22] Filed: Feb. 19, 1974

[21] Appl. No.: 443,227

[52] U.S. Cl. .................. 65/60; 423/462; 427/226; 427/407; 427/419; 427/421; 427/427
[51] Int. Cl.². C03C 17/22; B05D 1/36; B05D 3/02; B05D 1/02
[58] Field of Search............ 423/462; 117/124 T, 72, 117/94, 124 A, 124 B, 124 D, 124 E; 65/60

[56] References Cited
UNITED STATES PATENTS

| | | | |
|---|---|---|---|
| 2,831,780 | 4/1958 | Deyrup | 117/124 B |
| 3,004,863 | 10/1961 | Gray | 117/124 A |
| 3,323,889 | 6/1967 | Carl | 117/94 |
| 3,387,994 | 6/1968 | Danton | 117/94 |
| 3,414,429 | 12/1968 | Bruss | 117/88 |
| 3,519,408 | 7/1970 | Russell | 117/124 T |
| 3,667,926 | 6/1972 | Green | 117/124 D |

OTHER PUBLICATIONS

Chemical Abstracts, Vol. 60: 15468a.
Chemical Abstracts, Vol. 78: 165198u 7-2-73.
Mellor, *A Comprehensive Treatise on Inorganic and Theoretical Chemistry*, Vol. VII, pp. 82-83. 1927.

*Primary Examiner*—William D. Martin
*Assistant Examiner*—William H. Schmidt
*Attorney, Agent, or Firm*—Kenyon & Kenyon Reilly Carr & Chapin

[57] ABSTRACT

An inorganic titanium coating believed to be a titanium oxide coating is applied to a glass surface by exposing the surface at elevated temperature, desirably at least 300°F., to a liquid comprising a titanium oxychloride of the formula $Ti(OH)_xCl_{(4-x)}$ wherein $x$ is 1, 2 or 3, for example an aqueous solution of a titanium oxychloride. The process is especially useful for providing the "hot end coating" of a dual protective coating for glass containers comprising an inorganic "hot end coating" and a lubricious organic "cold end coating".

8 Claims, No Drawings

METHOD FOR APPLYING AN INORGANIC TITANIUM COATING TO A GLASS SURFACE

This invention relates to an improved method for applying an inorganic titanium coating to a glass surface. More particularly, this invention is concerned with an improved method for applying an inorganic titanium hot end coating to a glass container.

BACKGROUND OF THE INVENTION

It has long been known that inorganic coatings can be applied to a glass surface by contacting a hot glass surface with a thermally-decomposable metallic compound, whereby the compound, when brought in contact with the hot glass, decomposes to form what is believed to be a metal oxide layer on the surface of the hot glass. Processes of this type were disclosed by Lyle in U.S. Pat. No. 2,375,482 for imparting an iridescent finish to glass.

More recently, processes of this type have been adapted for use in protective coatings for glass containers, particularly beverage bottles and other similar containers. In these processes glass containers, such as glass bottles, while still hot from the bottle-forming equipment and before passage through the annealing lehr, are treated with a thermally-decomposable metal compound, usually stannic chloride, under conditions such that a thin coating is formed on the container surface. This coating is thinner than that taught by Lyle, and serves to anchor a lubricious organic polymer or wax coating applied to the container surface after the container exits from the lehr. This combination of tin oxide "hot end" coating and organic "cold end" coating has been found useful in improving the scratch resistance and lubricity of glass containers.

Although this combined coating has been found useful, the generally employed methods of applying a hot end coating have several drawbacks. Generally anhydrous compounds, especially anhydrous stannic chloride, were employed which led to numerous problems. First, it was necessary to entrain the tin halide fumes in a dry air stream, which normally is accomplished by bubbling dry air through a liquid tin halide. If moisture should be introduced into the resulting air stream, a precipitate results which may inhibit the flow of entrained tin halide fumes, thereby causing a reduction in the amount of coating material supplied to the application chamber and which is corrosive to most materials used in the manufacture of the equipment employed.

Next, it is difficult to ensure formation of a uniform hot end coating when such a stream is used because the metal halide fumes can react with moisture in the atmosphere before contacting the glass surface. The result is non-uniform coating thicknesses and poor bottle-to-bottle reproducibility. Moreover, the loss of metal halide through such a reaction seriously reduces the efficiency of the use of the expensive metal halide reagent.

Finally, it is essential to prevent formation of a metal oxide coating on the finish, or mouth, of bottles so as to avoid corrosion of bottle caps. This control is difficult to achieve with air streams containing entrained metal halide fumes, especially with the so-called "stubby" beer bottles which are commonly employed today.

Although tin oxide coatings, especially those derived from anhydrous stannic chloride, have been most common, efforts have been made to provide other metal oxide films, notably titanium oxide films, on glass. For example, Deyrup, in U.S. Pat. No. 2,831,780 issued Apr. 22, 1958, discloses applying vapors of a metallo-organic compound such as tetra-isopropyl titanante to hot glass (450°–600°C.). According to Deyrup the corresponding inorganic compounds are either too heat stable or insufficiently volatile without decomposition to be suitable for such use. Subsequently Gray et al., in U.S. Pat. No. 3,004,863 described a process in which aqueous solutions of certain aqueous acid-soluble titanates were applied to glass at room temperature and the glass was thereafter annealed, at which time the titanium oxide coating was formed. Still more recently, Green et al., in U.S. Pat. No. 3,667,926 issued June 6, 1972, disclosed a process wherein an aqueous solution of a water-soluble titanium composition was sprayed onto hot glass. As was the case with Deyrup and Gray et al., Green et al. employed solutions of organo titanium compounds. Anhydrous titanic chloride has been employed in some instances, notably for coating baby food jars. However, titanic chloride is much more reactive with moisture than stannic chloride, and accordingly more stringent precautions must be taken. Moreover, the outlet for the titanic chloride must be extremely close to the glass surface so that the fumes will react with the glass surface before reacting with atmospheric moisture.

Despite continued efforts to develop a practical titanium oxide coating, the method of choice today continues to employ the relatively less expensive anhydrous tin tetrachloride in preference to the more expensive organo metallic titanium compounds or the more difficult to use anhydrous titanic chloride.

BRIEF SUMMARY OF THE INVENTION

It is an object of this invention to provide an improved method for applying a metal oxide coating to a glass surface.

It is a further object of this invention to provide an improved method of applying metal oxide hot end coatings to glass containers.

A still further object of this invention is to provide a simple, economical process for applying hot end metal oxide coatings to glass containers which is free of the problems associated with the use of anhydrous metal halide reagents.

Another object of this invention is to provide an economical method for applying titanium oxide coatings to glass surfaces.

Still another object of this invention is to provide a method for employing inorganic titanium compounds as the thermally decomposable compound.

These and other objects of this invention, which are evident from the specification and claims, are achieved by spraying a solution of a titanium oxychloride onto a heated glass surface. The use of such a solution avoids the need for equipment to afford anhydrous air streams of stannic chloride and the attendant problems. In particular, air dryers and pressure feed lines necessitated by the use of anhydrous stannic chloride fumes are obviated, and a simple gravity feed system can be employed. In addition, the use of a liquid medium affords much greater control over the thickness and height of the resulting metal oxide coating on the container. Because of the greater control, long spraying distances are feasible, thus enabling the use of wider passageways and minimizing container jam-ups at the hot end application station. Furthermore, titanium oxychlorides can produce equivalent coatings at considerably lower cost than the anhydrous stannic chloride, and are easier and safer to store than anhydrous tin halides.

The suitability of titanium oxychlorides for this purpose is unexpected and surprising in light of the difficulties encountered in the use of anhydrous titanic tetrachloride, the teachings of Deyrup that inorganic titanium compounds cannot be employed, and the continued efforts of the art to develop procedures employing organic titanium compounds.

DETAILED DESCRIPTION

The titanium oxychlorides employed in accordance with this invention may be represented by the formula:

$$Ti(OH)_xCl_{(4-x)}$$

wherein $x$ is 1, 2 or 3. Where $x$ is 4 the compound cannot be used to provide a coating to glass surfaces. These compounds are known, having been described, for example, in Mellor, "Inorganic and Theoretical Chemistry", Vol VII, Longman Group Ltd, London (1970) at pages 82–3.

The titanium oxychloride is employed in accordance with this invention in the form of an aqueous solution. Suitable solutions are obtained by adding anhydrous titanium tetrachloride to dilute hydrochloric acid to form a concentrated solution of titanium oxychloride. The resulting solution is further diluted with water prior to use.

The form of the titanium oxychloride which is obtained is determined by the concentration of the hydrochloric acid and the amount of titanium tetrachloride added to the acid. For example, the oxychloride wherein $x$ in the above formula is 1 predominates where titanium tetrachloride is added up to its solubility limit to an acid solution containing from about 25% to about 36% anhydrous hydrogen chloride. The oxychloride wherein $x$ is 2 predominates where the titanium tetrachloride is added up to its solubility limit to a solution containing from about 15% to about 20% anhydrous hydrogen chloride. Finally, the oxychloride wherein $x$ is 3 predominates when the titanium tetrachloride is added up to its solubility limit to a solution containing about 10–12% anhydrous hydrogen chloride. Intermediate hydrochloric acid concentrations or lesser amounts of titanium tetrachloride yield mixtures of the oxychlorides.

The reaction resulting upon addition of titanium tetrachloride to hydrochloric acid is exothermic, and it is desirable to cool the reaction mixture while adding the titanium chloride to it. In general, it is preferred that the reaction temperature be no greater than room temperature (about 25°C.). The amount of cooling required can be minimized by adding the titanium tetrachloride to the acid slowly, e.g. dropwise, while agitating the reaction mixture.

It is desired that the titanium oxychloride solution produced by the foregoing procedure be as concentrated as possible. The concentrate is then shipped to the ultimate consumer, e.g. the container manufacturer, who then dilutes the mixture to the desired concentration for application to the glass surface.

The concentration of titanium oxychloride in the working solution should be sufficient to provide a coating affording adequate scratch protection in a reasonable time. Ordinarily, improved scratch resistance is achieved at coating thicknesses at least about 10 CTU's (Coating Thickness Units), with thicknesses of about 30 CTU's or higher preferred. The concentration should not be so high, however, that a metallic sheen or an iridescence is imparted to the bottle surface (unless, of course, such an effect is desired). In general, working solutions containing up to about 4 weight percent titanium tetrachloride equivalents have been found useful, with solutions containing from about 0.2 to about 1.5 weight percent titanium tetrachloride equivalents being preferred for application times of the order of from about 3 to about 5 seconds. (These concentrations correspond to up to about 3.6 weight percent as $Ti(OH)Cl_3$, and from about 0.1 weight percent as $Ti(OH)_3Cl$ to about 1.4 weight percent as $Ti(OH)Cl_3$).

The dilute titanium oxychloride solution is applied to hot glassware, e.g. virgin containers just prior to annealing in the lehr, by conventional techniques. It is desired, however, that a high degree of atomization of the aqueous solution be employed to provide an acceptable appearance. That is, unless the solution is sufficiently finely divided, the surface of the treated glassware will leave blemishes which resemble water spots. A suitable level of atomization can be determined by spraying the solution onto a cool bottle and then counting the number of droplets deposited on the surface in, e.g. a 0.1 inch square, and then calculating the number of droplets per square inch. It has been found that satisfactory results are achieved when spraying bottles if the degree of atomization is sufficient to provide at least 4000 droplets per square inch.

The aqueous titanium oxychloride is applied to heated glass, e.g. freshly formed glass containers prior to annealing in a lehr. It has been unexpectedly and surprisingly found, however, that temperatures below those employed in prior art processes are feasible with the present process. For example, tin tetrachloride commonly is applied to glassware at temperatures of 900° to 1500°F. In contrast, temperatures of from about 300° to about 800°F. have been found optimum when employing aqueous titanium oxychloride solutions. Coating thickness is relatively independent within this range of temperatures, and thus uniform coatings are readily achieved despite fairly large variations of glass temperature so long as the temperature is within this temperature range. Moreover, the most efficient usage of the oxychloride solution, i.e. the coating thickness achieved per unit volume of aqueous titanium oxychloride solution is maximized, at temperatures within the range. Finally, superior coating appearance is achieved at temperatures within this range when compared with the appearance of coatings of comparable thickness obtained at higher or lower temperatures.

Because relatively low temperatures can be employed, the titanium oxychloride can be incorporated into the "cold end" spray applied to bottles after they are removed from the annealing lehr, provided the bottle temperature is greater than about 300°F., and preferably is around 500°F. The particular cold end coating material is not critical, and various waxes, polymer coatings such as polyethylene and the like are known and are useful. These materials normally are supplied as aqueous emulsions which can be admixed with the aqueous titanium oxychloride. Since the titanium oxychloride is acidic, the emulsion must be one which is stable in acidic media. Accordingly, emulsions prepared with non-ionic emulsifying agents are preferred. In such solutions the concentration of the organic coating material can be the same as that when the organic material is employed alone, e.g. from about 0.1 to about 0.5 weight percent of the solution.

The following examples are illustrative of this invention. In the examples, the following test procedures were employed:

1. Coating Thickness — The thickness of the coating achieved with the titanium oxychloride was measured with a Hot End Coating Meter manufactured by American Glass Research, Inc. and is reported in CTU's [1 CTU (Coating Thickness Unit) is approximately equal to 1 Angstrom].

2. Lubricity — The lubricity of the coating achieved with the titanium oxychloride was measured on an AGR Bottle Friction Machine as the coefficient of sliding friction between two coated glass surfaces. The lower the value of the coefficient of friction, the greater the degree of surface lubricity. [See Glass Container Manufacturer's Institute, Inc. Technical Bulletin No. 69].

3. Scratch Resistance — The scratch resistance of the coating achieved with the titanium oxychloride was measured on an AGR Bottle Friction Machine as the extent of surface damage produced during sliding contact when tested under a given load. Usually this value is expressed as a load in pounds under which continuous surface damage was produced during sliding contact. [See Glass Container Manufacturer's Institute, Inc. Technical Bulletin No. 69].

All parts and percentages are by weight unless otherwise specified.

EXAMPLE I

Several series of experiments were performed to evaluate the effect of coating thickness and application temperature upon coating lubricity and scratch resistance achieved with aqueous titanium oxychloride.

In the first series, 12-ounce, amber handy beer bottles were heated to 1100°F. in a muffle furnace and then placed in a series of furnaces at 1000°F., 800°F., 700°F. and 350°F. for varying lengths of time to simulate an annealing lehr. When the temperature of the bottles had fallen to 300°F., as measured by an Ircon Model 710 infra-red detector, the bottles were placed on a turntable and aqueous titanium oxychloride solutions formed by adding 10 parts of titanium tetrachloride to 50 parts of 50% hydrochloric acid to form a stock solution and subsequently diluting to form a solution of the desired concentration, were applied by a Binks model 16, internal mix spray gun for 1 revolution of the bottle (approximately 3 seconds). The concentration of the titanium oxychloride ranged from 0.09% to 4.2%, calculated as titanium tetrachloride, and provided coatings having thicknesses of up to about 55 CTU's. For each solution concentration, and hence for each coating thickness, 6 bottles were prepared.

After the bottles had cooled to 250°F. they were over-coated with a 0.27 weight percent dispersion of polyethylene in water with the spray gun through one revolution of the turntable.

Each of the resulting bottles was divided into three areas for testing, one area to be tested dry, one to be tested wet and one to be tested wet following a caustic wash (30 minutes at 150°F. with an aqueous solution of 4.5% sodium hydroxide and 0.5% trisodium phosphate) and heating in an autoclave at 15 psi and 250°F. for 60 minutes.

For each coating thickness, the 6 bottles were paired and, after storage for 24 hours, each pair was treated for scratch resistance and lubricity at 15 and 60 pounds load.

During each test, a trace of the coefficient of friction was made and the average maximum value was determined for each pair of samples. The metal oxide thickness was then measured for both bottles of each pair at 10 locations around the track area for a given test condition and load. The measurements for each bottle were averaged and the minimum average value of a pair for a given load and condition was calculated.

In the second series of experiments, the procedure was repeated, except that the bottles were removed from the 700°F. furnace and the titanium oxychloride solution was applied at 600°F. and the bottles were placed in the 350°F. furnace to complete the cycle.

In the third and fourth series, the bottles were allowed to cool to 800°F. or 1050°F., respectively, upon removal from the muffle furnace, the titanium oxychloride solutions were applied, the bottles were then passed through the annealing cycle, the organic coating was applied and lubricity and scratch resistance were determined.

In general, good lubricity (maximum average coefficient not greater than about 0.1) was obtained in the dry and wet scratch tests at 15 and 60 pound loads for all coatings in excess of 20 CTU's for all application temperatures, and no bottle damage was observed for coating thicknesses of 30 CTU's or higher. However, coatings of less than 20–30 CTU's formed at 1050°F. had materially higher coefficients of friction and/or exhibited surface damage.

Similar results were observed after the caustic wash and autoclave treatment, except that at the 60 pound load level, surface damage was observed on all bottles having coating thicknesses of not greater than about 20 CTU's, except those coated at 600°F., which were acceptable at thicknesses as low as 10 CTU's. Coefficients of friction were all considerably higher than in the other tests, and did not reach a minimum value (of about 0.1) until thicknesses of at least 20–30 CTU's were achieved.

Based upon the results of these experiments, it was concluded that optimum results are achieved with an aqueous titanium oxychloride solution of sufficient concentration to provide a coating thickness of at least about 30 CTU's. At this level, lubricity and scratch resistance are independent of application temperature. However, satisfactory lubricity and scratch resistance are achieved at lower thicknesses (10–20 CTU's) if the application temperature is about 600°F.

EXAMPLE II

Solutions of titanium oxychloride and polyethylene were evaluated as protective lubricious coatings applied in the cold end by first heating 12-ounce amber handy bottles in a muffle furnace to the desired application temperatures (300°F., 400°F. or 500°F.) and allowing the bottles to "soak" for 15 minutes to assure uniform glass surface temperature. The bottles were then removed from the furnace, placed on a revolving turntable and, when the surface temperature of the bottles had reached the desired temperature, as measured by an Ircon Model 710 Infra-red detector, the coating solution was applied by a Binks Model 16 internal mix spray gun for the length of time of 1 revolution (approximately 3 seconds). Nine solutions were evaluated in which the titanium oxychloride concentration of the solution was 0.27%, 0.5% or 0.8% and the polyethylene concentration of the solution was 0.21%, 0.27% or 0.33%*.

*The polyethylene was added in the form of an aqueous emulsion sold by New Jersey Specialty Chemicals under the trade-designation SC-100, and is a 21% solids emulsion of an ethylene copolymer (Allied Chemical 540 polyethylene).

The bottles were then stored under ambient conditions for at least 24 hours and tested for coating thickness, lubricity and scratch resistance.

The data from these tests are summarized as follows:

TABLE I

Lubricity and Scratch Resistance Results*
(0.27% of Solution Oxychloride)

| Solution Concentration as SC-100 | Application Temperature | $t_{min.}$ (CTU's) | Tested Dry $\bar{\mu}$max.-D 15 lbs. | 60 lbs. | Tested Wet $\bar{\mu}$max.-D 15 lbs. | 60 lbs. | Tested Wet Following Caustic Wash - Autoclave $\bar{\mu}$max.-D 15 lbs. | 60 lbs. |
|---|---|---|---|---|---|---|---|---|
| .21% | 300°F | 25 | .135-i | .110-i | .075-N | .125-N | .130-N | .150-i |
|  |  | 20 | .100-i | .099-N | .080-N | .090-N | .230-i | .200-i |
|  | 400°F | 33 | .130-N | .110-N | .090-N | .070-i | .160-i | .210-C |
|  |  | 25 | .111-N | .105-i | .090-N | .085-N | .120-N | .260-C |
|  | 500°F | 29 | .120-N | .113-i | .080-N | .100-i | .140-N | .220-C |
| .27% | 300°F | 18 | .110-N | .110-i | .070-N | .080-i | .390-i | .350-C |
|  |  | 29 | .100-i | .095-N | .070-N | .110-i | .170-N | .260-C |
|  | 400°F | 20 | .110-N | .115-i | .065-N | .080-N | .135-N | .180-i |
|  |  | 26 | .105-N | .100-i | .070-N | .110-i | .120-N | .120-i |
|  | 500°F | 25 | .100-N | .103-i | .070-N | .140-C | .130-N | .205-C |
| .33% | 300°F | 20 | .090-N | .080-i | .060-N | .080-N | .270-N | .260-C |
|  |  | 20 | .088-N | .110-C | .060-N | .085-i | .250-i | .260-C |
|  | 400°F | 24 | .093-N | .099-i | .051-N | .059-N | .110-N | .330-C |
|  |  | 20 | .100-N | .090-N | .065-N | .075-N | .220-N | .340-C |
|  | 500°F | 23 | .100-N | .095-i | .060-N | .070-i | .155-N | .150-i |

*D = Glass surface damage
N = None
i = isolated crescent cracks
C = continuous damage
$\bar{\mu}$max. = average maximum coefficient of friction.
$t_{min.}$ = average minimum thickness

TABLE II

Lubricity and Scratch Resistance Results*
(0.5% of Solution Oxychloride)

| Solution Concentration as SC-100 | Application Temperature | tmin. (CTU's) | Tested Dry $\bar{\mu}$max.-D 15 lbs. | 60 lbs. | Tested Wet $\bar{\mu}$max.-D 15 lbs. | 60 lbs. | Tested Wet Following Caustic Wash - Autoclave $\bar{\mu}$max.-D 15 lbs. | 60 lbs. |
|---|---|---|---|---|---|---|---|---|
| .21% | 300°F | 49 | .130-N | .110-N | .135-N | .100-N | .170-N | .150-N |
|  |  | 49 | .120-N | .100-N | .140-N | .101-N | .210-N | .220-i |
|  | 400°F | 52 | .163-N | .150-N | .135-N | .130-N | .175-N | .110-N |
|  |  | 55 | .160-N | .173-N | .130-N | .105-N | .220-N | .150-N |
|  | 500°F | 61 | .190-N | .165-N | .170-N | .175-N | .175-N | .140-N |
|  |  | 65 | .185-N | .175-N | .140-N | .100-N | .160-N | .170-i |
| .27% | 300°F | 45 | .130-N | .110-N | .095-N | .080-N | .165-N | .180-i |
|  |  | 54 | .120-N | .110-N | .080-N | .080-N | .160-N | .150-i |
|  | 400°F | 49 | .131-N | .125-N | .090-N | .071-N | .150-N | .200-i |
|  |  | 60 | .130-N | .125-N | .081-N | .081-N | .160-N | .170-i |
|  | 500°F | 55 | .135-N | .130-i | .080-N | .091-N | .135-N | .120-N |
|  |  | 59 | .138-N | .130-i | .080-N | .090-N | .129-N | .120-N |
| .33% | 300°F | 51 | .125-N | .110-N | .080-N | .063-N | .125-N | .125-N |
|  |  | 55 | .105-N | .110-i | .081-N | .070-N | .130-N | .120-i |
|  | 400°F | 46 | .115-N | .120-N | .075-N | .075-N | .115-N | .110-i |
|  |  | 48 | .118-N | .111-N | .080-N | .080-N | .145-N | .140-i |
|  | 500°F | 55 | .130-N | .129-N | .091-N | .085-N | .115-N | .105-N |
|  |  | 50 | .130-N | .125-N | .080-N | .080-N | .125-N | .110-N |

*D = Glass surface damage
N = None
i = Isolated crescent cracks
C = Continuous damage
$\bar{\mu}$max. = average maximum coefficient of friction
tmin. = average minimum thickness

TABLE III

Lubricity and Scratch Resistance Results*
(0.8% of Solution Oxychloride)

| Solution Concentration as SC-100 | Application Temperature | tmin. (CTU's) | Tested Dry $\bar{\mu}$max.-D | | Tested Wet $\bar{\mu}$max.-D | | Tested Wet Following Caustic Wash - Autoclave $\bar{\mu}$max.-D | |
|---|---|---|---|---|---|---|---|---|
| | | | 15 lbs. | 60 lbs. | 15 lbs. | 60 lbs. | 15 lbs. | 60 lbs. |
| .21% | 300°F | 55 | .160-N | .130-N | .160-N | .115-N | .390-N | .450-C |
| | | 49 | .170-N | .140-N | .145-N | .120-N | .400-N | .480-C |
| | 400°F | 65 | .180-N | .170-i | .160-N | .140-N | .280-N | .270-i |
| | | 63 | .180-N | .150-N | .150-N | .120-N | .400-N | .520-C |
| | 500°F | 80 | .190-N | .165-N | .170-N | .150-N | .195-N | .170-N |
| | | 80 | .170-N | .160-N | .165-N | .160-N | .190-N | .170-N |
| .27% | 300°F | 50 | .145-N | .120-N | .135-N | .100-N | .230-N | .260-i |
| | | 50 | .155-N | .133-i | .120-N | .100-N | .200-N | .240-N |
| | 400°F | 61 | .160-N | .150-N | .115-N | .105-N | .150-N | .190-i |
| | | 55 | .170-N | .150-N | .140-N | .100-N | .270-N | .230-N |
| | 500°F | 66 | .185-N | .165-N | .135-N | .160-N | .200-N | .150-N |
| | | 60 | .171-N | .160-N | .130-N | .105-N | .170-N | .150-N |
| .33% | 300°F | 43 | .135-N | .110-N | .100-N | .075-N | .150-N | .220-i |
| | | 41 | .125-N | .120-i | .100-N | .079-N | .210-N | .240-i |
| | 400°F | 49 | .150-N | .130-N | .100-N | .085-N | .160-N | .130-N |
| | | 45 | .135-N | .120-N | .090-N | .085-N | .170-N | .220-i |
| | 500°F | 55 | .155-N | .160-N | .113-N | .150-N | .130-N | .130-N |
| | | 55 | .140-N | .145-N | .100-N | .090-N | .145-N | .120-N |

*D = Glass surface damage
N = None
i = Isolated crescent cracks
C = Continuous damage
$\bar{\mu}$max. = average maximum coefficient of friction
tmin. = average minimum thickness As is evident from Table I, the metal oxide level for all temperatures and organic concentrations at 0.27% titanium oxychloride is between approximately 15–30 CTU's. The lubricity and scratch resistance results show a poor degree of film performance for bottles tested at a 60 pound load after a caustic wash and autoclave pretreatment.

Table II, which summarizes the test results of solutions employing 0.5% titanium oxychloride, shows the expected increase in metal oxide thickness as the percentage of oxychloride in solution is increased. Also, the lubricity and scratch resistance values indicate a higher degree of film performance than those samples reported in Table I. Generally, the best performance characteristics were obtained for an application temperature of 500°F. employing either 0.27% or 0.33% of the spray solution as SC-100 polyethylene.

Table III summarizes the test results with the solutions containing 0.8% titanium oxychloride, and shows a slight increase in the metal oxide thickness corresponding to the change in oxychloride concentration. However, there appears to be no change in the film performance over the results summarized in Table II.

What is claimed is:

1. In a method for applying an in-organic titanium-containing coating to a glass surface comprising exposing said surface to a thermally-decomposable titanium compound at an elevated temperature sufficient to cause thermal decomposition of said compound to form said coating, the improvement wherein said coating is formed by spraying onto said surface a finely divided dilute aqueous solution of a titanium oxychloride of the formula $Ti(OH)_xCl_{(4-x)}$, wherein $x$ is 1, 2, or 3, said temperature ranging from about 300°F. to about 800°F.

2. The method according to claim 1 wherein the concentration of said titanium oxychloride in said solution is up to about 4 weight percent, calculated as titanium tetrachloride.

3. The method according to claim 1 wherein the degree of atomization of said spray is sufficient to provide at least 4000 droplets per square inch at the glass surface.

4. In a method for imparting improved scratch resistance and lubricity to a glass container comprising applying an inorganic titanium-containing coating and a lubricous organic coating to the outer surface of said container, said titanium-containing coating being formed by applying a thermally-decomposable compound to the surface of said container at an elevated temperature sufficient to cause thermal decomposition of said compound to form said coating, the improvement wherein said inorganic coating is formed by spraying a finely divided dilute aqueous solution of a titanium oxychloride of the formula $Ti(OH)_xCl_{(4-x)}$, wherein $x$ is 1, 2 or 3, onto said container, said temperature ranging from about 300°F. to about 800°F.

5. The method according to claim 4 wherein the concentration of said titanium oxychloride in said solution is up to about 4 weight percent, calculated as titanium tetrachloride.

6. The method according to claim 4 wherein said aqueous solution is applied to virgin containers just prior to annealing.

7. The method according to claim 4 wherein said solution includes an organic lubricous coating material and said solution is applied to said container surface after annealing and at a temperature of from about 300°F. to about 500°F.

8. The method according to claim 4 wherein the degree of atomization of said spray is sufficient to provide at least 4000 droplets per square inch at the glass surface.

* * * * *